(12) United States Patent
McDonald

(10) Patent No.: US 12,059,944 B2
(45) Date of Patent: Aug. 13, 2024

(54) POWER DISTRIBUTION IN TRANSPORT REFRIGERATION SYSTEM

(71) Applicant: Carrier Corporation, Palm Beach Gardens, FL (US)

(72) Inventor: Patrick McDonald, Athens, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 191 days.

(21) Appl. No.: 17/252,956

(22) PCT Filed: May 18, 2020

(86) PCT No.: PCT/US2020/033423
§ 371 (c)(1),
(2) Date: Dec. 16, 2020

(87) PCT Pub. No.: WO2020/242802
PCT Pub. Date: Dec. 3, 2020

(65) Prior Publication Data
US 2022/0072932 A1    Mar. 10, 2022

Related U.S. Application Data

(60) Provisional application No. 62/852,451, filed on May 24, 2019.

(51) Int. Cl.
*B60H 1/32* (2006.01)
*B60H 1/00* (2006.01)

(52) U.S. Cl.
CPC ....... *B60H 1/3222* (2013.01); *B60H 1/00364* (2013.01); *B60H 1/3232* (2013.01); *B60H 2001/3292* (2013.01)

(58) Field of Classification Search
CPC ............. B60H 1/3222; B60H 1/00364; B60H 1/3232; B60H 2001/3292
(Continued)

(56) References Cited

U.S. PATENT DOCUMENTS 8,295,950 B1 * 10/2012 Wordsworth ........ B60H 1/3232
            700/297
9,085,218 B2    7/2015 Awwad
(Continued)

FOREIGN PATENT DOCUMENTS

| EP | 3399618 A1 | 11/2018 |
| WO | 2010002644 A1 | 1/2010 |
| WO | 2015191912 A1 | 12/2015 |

OTHER PUBLICATIONS

International Search Report issued in Application No. PCT/US2020/033423 on Aug. 7, 2020, 6 pages.
(Continued)

*Primary Examiner* — Jon T. Schermerhorn, Jr.
(74) *Attorney, Agent, or Firm* — CANTOR COLBURN LLP

(57) ABSTRACT

A transport refrigeration system includes a refrigeration unit including a controller configured to control the refrigeration unit: an electric power device configured to provide power to a refrigeration component of the refrigeration unit: an export power module (EPM) including: an EPM controller in communication with the controller: a power control device configured to receive power from the electric power device: an auxiliary device coupled to the power control device: wherein the controller is configured to communicate with the EPM controller to control power supplied from the electric power device to the auxiliary device.

5 Claims, 4 Drawing Sheets

(58) Field of Classification Search
USPC .......................................................... 62/243
See application file for complete search history.

(56) References Cited

U.S. PATENT DOCUMENTS

2016/0089958 A1   3/2016   Powell
2018/0065450 A1   3/2018   Hurst et al.

OTHER PUBLICATIONS

Written Opinion issued in Application No. PCT/US2020/033423 on Aug. 7, 2020, 7 pages.

\* cited by examiner

POWER DISTRIBUTION IN TRANSPORT REFRIGERATION SYSTEM

CROSS REFERENCE TO RELATED APPLICATIONS

This application claims the benefit of U.S. Application No. 62/852,451, filed on May 24, 2019, which is incorporated herein by reference in its entirety.

BACKGROUND

The subject matter disclosed herein relates generally to transport refrigeration systems, and more particularly to controlling electric power distribution in a transport refrigeration system.

Transport refrigeration systems often employ a source of electric power to power refrigeration components, such as a compressor, fans, heating coils, etc. An existing transport refrigeration system uses an engine driven generator to produce electric power. At times, the transport refrigeration system does not require all the electric power produced by the source of electric power.

BRIEF DESCRIPTION

According to one embodiment, a transport refrigeration system includes a refrigeration unit including a controller configured to control the refrigeration unit; an electric power device configured to provide power to a refrigeration component of the refrigeration unit; an export power module (EPM) including: an EPM controller in communication with the controller; a power control device configured to receive power from the electric power device: an auxiliary device coupled to the power control device; wherein the controller is configured to communicate with the EPM controller to control power supplied from the electric power device to the auxiliary device.

In addition to one or more of the features described above, or as an alternative, further embodiments may include wherein the EPM controller is configured to determine a power requested by the auxiliary device: the EPM controller is configured to communicate the power requested to the controller.

In addition to one or more of the features described above, or as an alternative, further embodiments may include wherein the controller is configured to determine a power available from the refrigeration unit.

In addition to one or more of the features described above, or as an alternative, further embodiments may include wherein the controller is configured to determine the power available in response to a sensed output of the electric power device.

In addition to one or more of the features described above, or as an alternative, further embodiments may include wherein the controller is configured to determine the power available in response to an operating mode of the refrigeration unit.

In addition to one or more of the features described above, or as an alternative, further embodiments may include wherein the controller is configured to compare the power requested to the power available.

In addition to one or more of the features described above, or as an alternative, further embodiments may include wherein the controller is configured to enable full export of power from the refrigeration unit to the auxiliary device when the power available exceeds the power requested.

In addition to one or more of the features described above, or as an alternative, further embodiments may include wherein the controller is configured to enable limited export of power from the refrigeration unit to the auxiliary device when the power available does not exceed the power requested.

In addition to one or more of the features described above, or as an alternative, further embodiments may include wherein the power control device imposes a current limit on the power provided to the auxiliary device.

In addition to one or more of the features described above, or as an alternative, further embodiments may include an auxiliary power source configured to augment power supplied from the electric power device to the auxiliary device.

According to another embodiment, a method for distributing power in a transport refrigeration system includes generating power at a refrigeration unit: determining a power requested by an auxiliary device; determining a power available from the refrigeration unit: comparing the power requested to the power available: distributing power from the refrigeration unit to the auxiliary device in response to the comparing the power requested to the power available.

In addition to one or more of the features described above, or as an alternative, further embodiments may include wherein determining the power available comprises sensing an output of the refrigeration unit.

In addition to one or more of the features described above, or as an alternative, further embodiments may include wherein determining the power available comprises determining an operating mode of the refrigeration unit.

In addition to one or more of the features described above, or as an alternative, further embodiments may include enabling full export of power from the refrigeration unit to the auxiliary device when the power available exceeds the power requested.

In addition to one or more of the features described above, or as an alternative, further embodiments may include enabling limited export of power from the refrigeration unit to the auxiliary device when the power available does not exceed the power requested.

In addition to one or more of the features described above, or as an alternative, further embodiments may include imposing a current limit on the power provided to the auxiliary device.

Technical effects of embodiments include the ability to provide power distribution in a transport refrigeration system such that power to auxiliary device(s) is provided in a controlled, metered manner.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
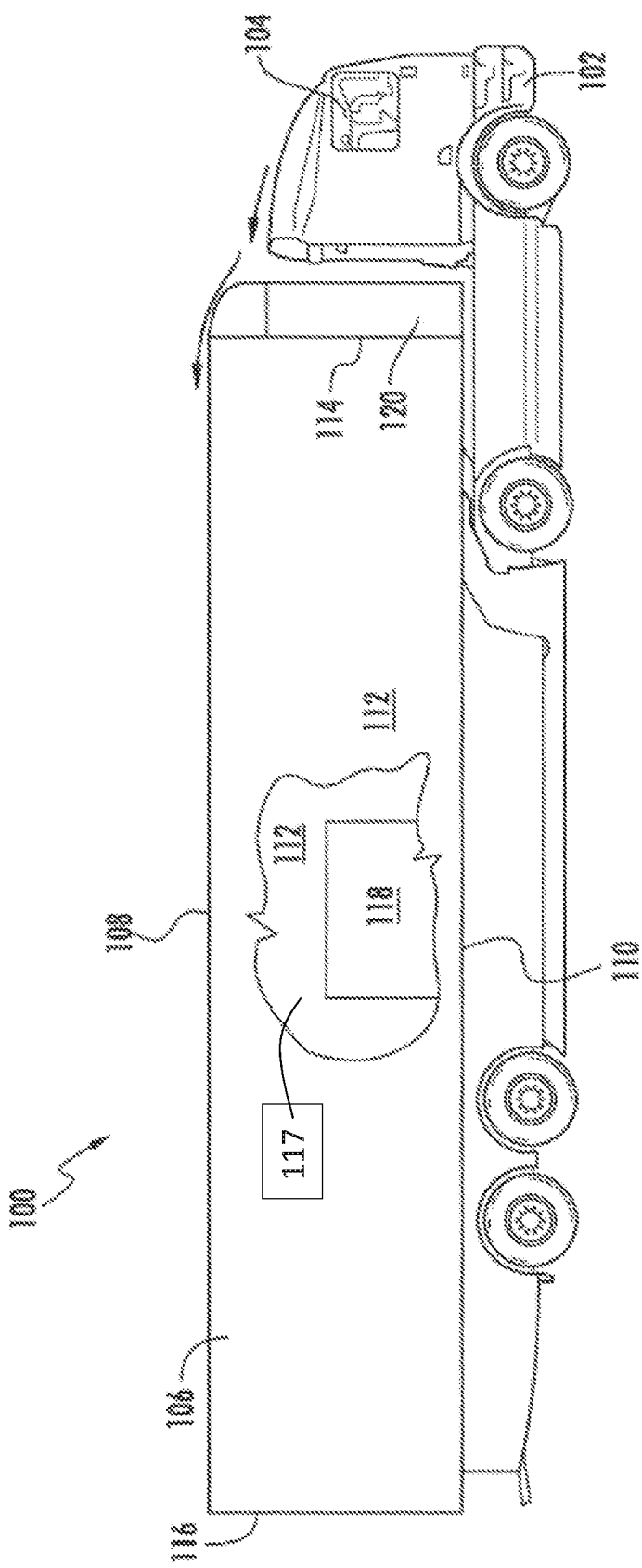
FIG. 1 depicts a tractor trailer system in an example embodiment.

FIG. 1 depicts a tractor trailer system 100 in an example embodiment. The tractor trailer system 100 includes a tractor 102 including an operator's compartment or cab 104 and an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment 117. The trailer 106 is configured to maintain a cargo 118 located inside the cargo compartment 117 at a selected temperature through the use of a transport refrigeration system 120 located on or next to the trailer 106. The transport refrigeration system 120, as shown in FIG. 1, is located at or attached to the front wall 114. Although the transport refrigeration system 120 is depicted as part of a tractor trailer system 100, the transport refrigeration system 120 may be used with containers having a cargo compartment, the containers shippable by land, sea, air, etc.

Figure 2:
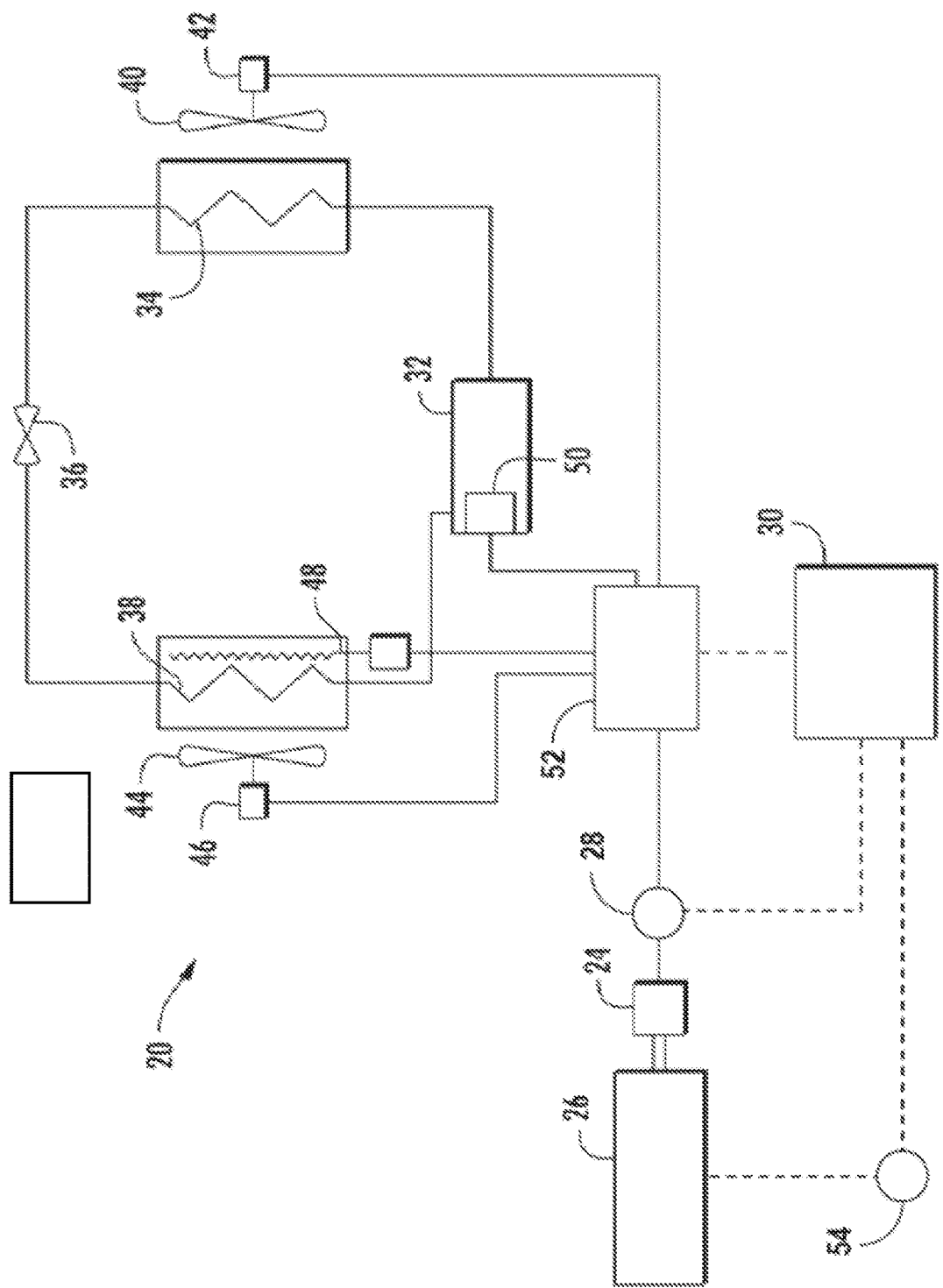
FIG. 2 depicts a refrigeration unit in an example embodiment.

FIG. 2 depicts a refrigeration unit 20 of the transport refrigeration system 120 in an example embodiment. The refrigeration unit 20 includes an electric power device 24 (e.g., a generator), a prime mover 26 (e.g., a diesel engine) for driving the electric power device 24 and a controller 30. The refrigeration unit 20 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 20 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 20 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 20 is operating in a subcritical refrigerant cycle or as a refrigerant gas cooler, such as if the refrigeration unit 20 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo compartment 117 across the tubes of the refrigerant heat absorption heat exchanger 38 to heat and evaporate refrigerant liquid passing through the tubes and cool the air. The air cooled traversing the refrigerant heat absorption heat exchanger 38 is supplied back to the temperature controlled compartment 117. It is to be understood that the term "air" when used herein with reference to the atmosphere within the cargo compartment 117 includes mixtures of air with other gases, such as for example, but not limited to, nitrogen or carbon dioxide, sometimes introduced into a refrigerated cargo compartment 117 for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The controller 30 is configured for controlling operation of the refrigeration unit 20 including, but not limited to, operation of various components of the refrigeration unit 20 to provide and maintain a desired thermal environment within the cargo compartment 117, that is within the temperature controlled space in which a perishable product is stowed. The controller 30 may be an electronic controller including a microprocessor and an associated memory. The controller 30 controls operation of various components of the refrigeration unit 20, such as the refrigerant compression device 32 and its associated drive motor 50, the fan motors 42, 46 and the electric resistance heater 48. The controller 30 may also be able to selectively operate the prime mover 26, typically through an electronic engine controller 54 operatively associated with the prime mover 26.

The refrigeration unit 20 has a plurality of refrigeration components using electric power, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater 48 may be selectively operated by the controller 30 whenever a control temperature within the temperature controlled cargo compartment 117 drops below a preset lower temperature limit, which may occur in a cold ambient environment. In such an event the controller 30 would activate the electric resistance heater 48 to heat air circulated over the electric resistance heater 48 by the fan(s) 44 associated with the refrigerant heat absorption heat exchanger 38. The electric resistance heater 48 may also be used to defrost the refrigerant heat absorption heat exchanger 38.

The prime mover 26, which comprises an on-board fossil-fuel engine, most commonly a diesel engine, drives the electric power device 24 that generates electrical power. The drive shaft of the engine drives the shaft of the electric power device 24. In an electrically powered embodiment of the transport refrigeration system 120, the electric power device 24 may comprise a single, on-board, engine driven AC generator configured to generate alternating current (AC) power including at least one AC voltage at one or more frequencies. In an embodiment, the electric power device 24 may, for example, be a permanent magnet AC generator or a synchronous AC generator. In another embodiment, the electric power device 24 may comprise a single on-board, engine driven DC generator configured to generate direct current (DC) power at least one voltage. Some electric generation devices may have internal voltage regulators while other electric generation devices do not. In another embodiment, the electric power device 24 does not contain an internal voltage regulator and thus the voltage of the electric power device 24 is unregulated by the electric power device 23 itself. The refrigeration unit 20 has a sensor 28 to sense the voltage and/or current of the electric power device 24. As each of the fan motors 42, 46 and the compression device drive motor 50 may be an AC motor or a DC motor, it is to be understood that one or more power converters 52, such as AC to DC rectifiers. DC to AC inverters, AC to AC voltage/frequency converters, and DC to DC voltage converters, may be employed in connection with the electric power device 24 as appropriate.

In other embodiments, the electric power device 24 may include a battery which can be charged using regenerative sources (e.g., brakes of the tractor-trailer, axle mounted generators, solar panels, etc.). The prime mover 26 may be eliminated, or used only when the battery charge is at a low level.

Figure 3:
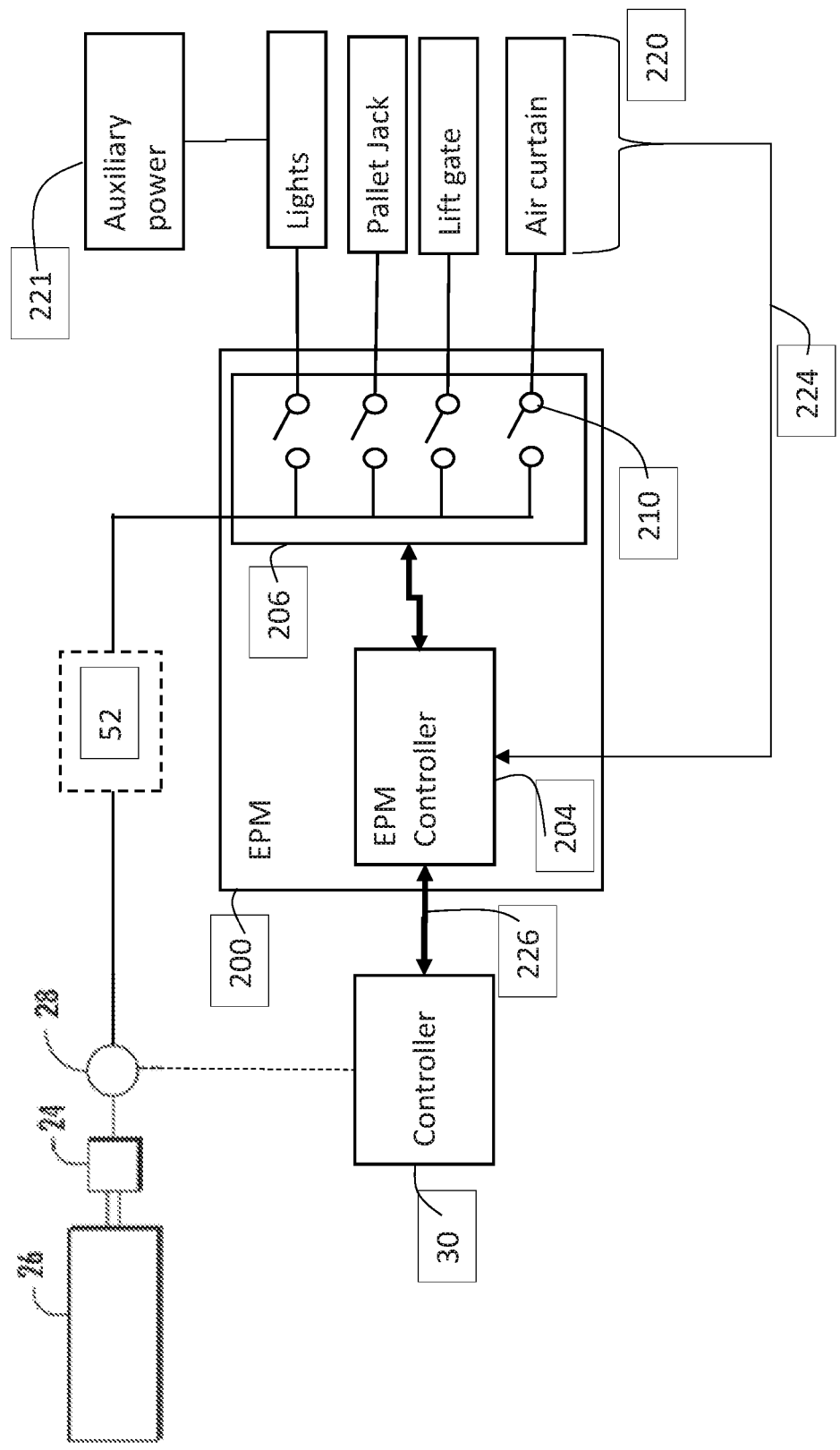
FIG. 3 depicts an export power module and auxiliary devices in an example embodiment.

FIG. 3 depicts power distribution from the refrigeration unit 20 to auxiliary devices 220 in an example embodiment. At times, the electric power device 24 provides more power than is needed by the refrigeration unit 20. Excess power may be used by one or more auxiliary devices 220. As shown in FIG. 3, an export power module (EPM) 200 is coupled to the electric power device 24 to receive power from the electric power device 24. Power from the electric power device 24 may pass through the power converter(s) 52 prior to supply to the export power module 200. The export power module 200 includes an EPM controller 204. The EPM controller 204 may be an electronic controller including a microprocessor and an associated memory. Power from the electric power device 24 is supplied to a switching module 206 for distribution to one or more auxiliary devices 220. The auxiliary devices 220 may include electrically powered devices such as lights in the cargo compartment 117, a pallet jack, a lift gate of trailer 106, an air curtain of the trailer 106, etc. The auxiliary devices 220 in FIG. 3 are examples, and embodiments are not limited to the auxiliary devices 220 depicted in FIG. 3. The auxiliary devices 220 may also connected to an auxiliary power source 221, such as shore power, a battery, etc.

The switching module 206 includes one or more power control devices 210 controlled by the EPM controller 204. The power control devices 210 may be electro-mechanical (e.g., relays) or electrical (e.g., power transistors). The power control devices 210 may control an amount of power supplied to the auxiliary devices 220 through, for example, a voltage controlled current/voltage regulator. The EPM controller 204 is in communication with the auxiliary devices 220 via a wired and/or wireless interface 224, such as a controller area network (CAN) bus. The EPM controller 204 is also in communication with the controller 30 via a via a wired and/or wireless interface 226, such as a CAN bus. The interfaces 224 and 226 may be implemented using a single interface, such as a CAN bus.

Figure 4:
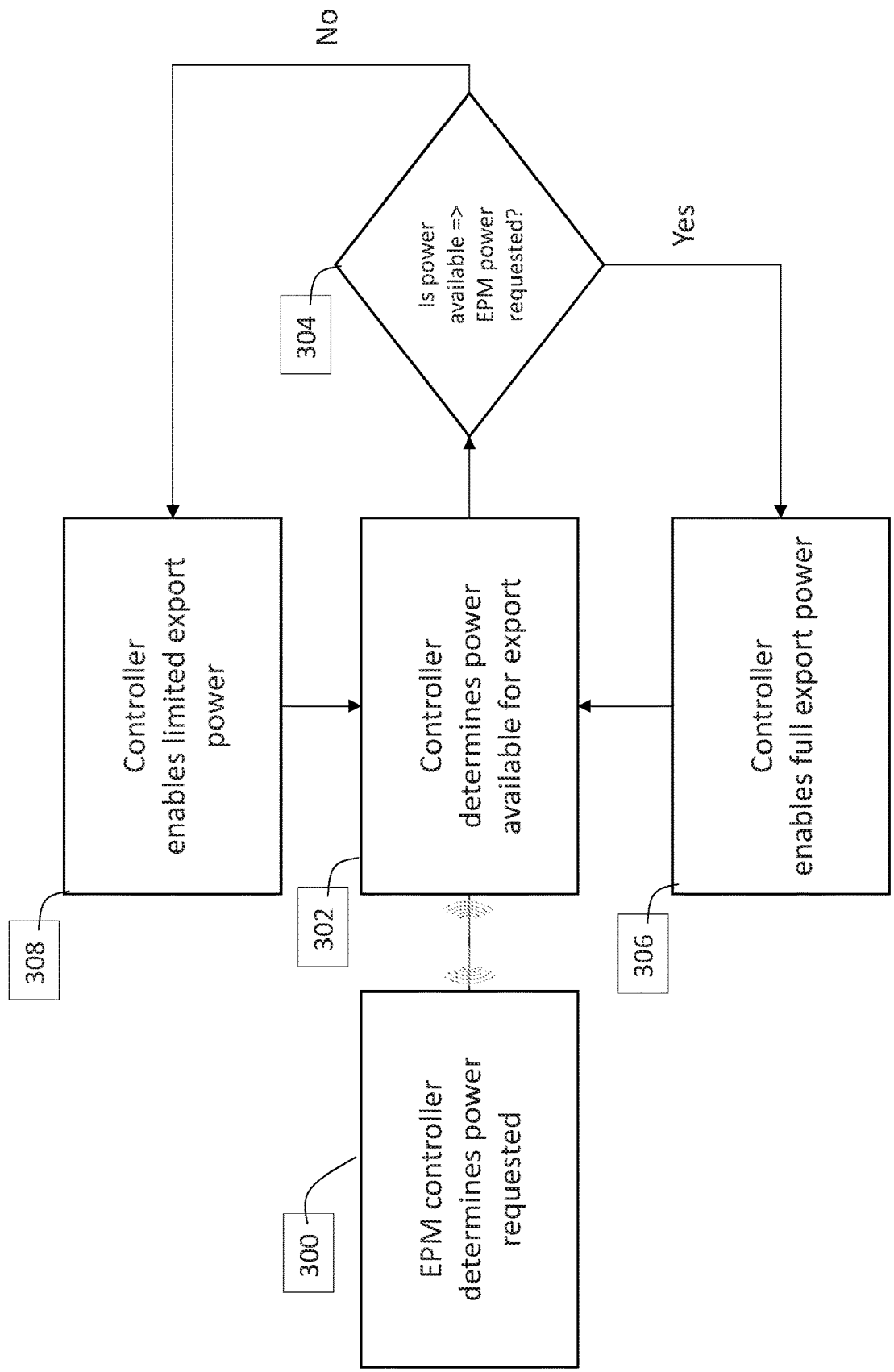
FIG. 4 depicts a process for distributing electric power in an example embodiment.

FIG. 4 depicts a process of controlling power distribution in the transport refrigeration system 120. The process begins at 300 where the EPM controller 204 determines a power requested by one or more of the auxiliary devices 220. This may be achieved by the EPM controller 204 receiving a power request over the interface 224. The power request may be in the form of a power-on signal from a respective auxiliary device 220. The EPM controller 204 may store power requirements for each of the auxiliary devices 220 in memory to determine the power requested.

The EPM controller 204 communicates the power requested to the controller 30 over the interface 226. At 302, the controller 30 determines a power available from the refrigeration unit 20. The controller 30 may determine the output voltage and/or current from the electric power device 24 through sensor 28. The controller 30 may also determine the operating mode of the refrigeration unit 20, such as pull-down, steady state, heating, defrost, off, etc. In response to the output of the electric power device 24 and/or the operating mode of the refrigeration unit 20, the controller 30 determines the power available from the refrigeration unit 20.

At 304, the controller 30 determines if the power available from the refrigeration unit 20 is greater than or equal to the power requested by the EPM controller 204. If so, flow proceeds to 306 where the controller 30 communicates with the EPM controller 204 to enable full export power to the auxiliary devices 220. The EPM controller 204 controls the power control devices 210 to provide all available power from the refrigeration unit 20 to one or more of the auxiliary devices 220. If additional power is needed, the auxiliary power source 221 may be used to augment power from the refrigeration unit 20.

If at 304, the power available from the refrigeration unit 20 is not greater than or equal to the power requested by the EPM controller 204, flow proceeds to 308. At 308, the controller 30 communicates with the EPM controller 204 to enable limited export power to the auxiliary devices 220. The controller 30 may send a command to the EPM controller 204 indicating a current limit. The EPM controller 204 controls the power control devices 210 to limit power from the refrigeration unit 20 to one or more of the auxiliary devices 220. For example, the EPM controller 204 may generate a command voltage to a power control device 210, the command voltage imposing a current limit on the power provided to the auxiliary devices 220. If additional power is needed, the auxiliary power source 221 may be used to augment power from the refrigeration unit 20.

The terminology used herein is for the purpose of describing particular embodiments only and is not intended to be limiting of the present disclosure. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations. Further, one of ordinary skill in the art will appreciate that the steps described in conjunction with the illustrative figures may be performed in other than the recited order, and that one or more steps illustrated may be optional.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A transport refrigeration system comprising:
a refrigeration unit including:
a controller configured to control the refrigeration unit;
an electric power device configured to provide power to a refrigeration component of the refrigeration unit;
an export power module (EPM) including:
an EPM controller in communication with the controller;
a power control device configured to receive power from the electric power device;
an auxiliary device coupled to the power control device;
wherein the controller is configured to communicate with the EPM controller to control power supplied from the electric power device to the auxiliary device;
wherein the EPM controller is configured to determine a power requested by the auxiliary device and communicate the power requested to the controller;
wherein the controller is configured to:
determine a power available from the refrigeration unit;
compare the power requested to the power available;
enable full export of power from the refrigeration unit to the auxiliary device when the power available exceeds the power requested; and
enable limited export of power from the refrigeration unit to the auxiliary device when the power available does not exceed the power requested.

2. The transport refrigeration system of claim 1 wherein:
the controller is configured to determine the power available in response to a sensed output of the electric power device.

3. The transport refrigeration system of claim 1 wherein:
the controller is configured to determine the power available in response to an operating mode of the refrigeration unit.

4. The transport refrigeration system of claim 1 wherein:
the power control device imposes a current limit on the power provided to the auxiliary device.

5. The transport refrigeration system of claim 1 further comprising:
an auxiliary power source configured to augment power supplied from the electric power device to the auxiliary device.

* * * * *